US011575636B2

United States Patent
Cui et al.

(10) Patent No.: US 11,575,636 B2
(45) Date of Patent: Feb. 7, 2023

(54) METHOD OF MANAGING PROCESSING PROGRESS OF A MESSAGE IN A GROUP COMMUNICATION INTERFACE AND TERMINAL

(71) Applicant: VIVO MOBILE COMMUNICATION CO., LTD., Guangdong (CN)

(72) Inventors: Xiaodong Cui, Chang'an Dongguan (CN); Di Yao, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/079,203

(22) Filed: Oct. 23, 2020

(65) Prior Publication Data

US 2021/0044556 A1    Feb. 11, 2021

Related U.S. Application Data

(63) Continuation of application No. PCT/CN2019/083431, filed on Apr. 19, 2019.

(30) Foreign Application Priority Data

Apr. 25, 2018    (CN) .................... 201810380005.X

(51) Int. Cl.
*H04L 51/42* (2022.01)
*G06F 3/04842* (2022.01)
*G06F 3/04847* (2022.01)

(52) U.S. Cl.
CPC .......... *H04L 51/42* (2022.05); *G06F 3/04842* (2013.01); *G06F 3/04847* (2013.01)

(58) Field of Classification Search
CPC ....... H04L 51/22; H04L 51/046; H04L 51/42; G06F 3/04842; G06F 3/04847; G06F 3/0481; G06F 3/0488
See application file for complete search history.

(56) References Cited

U.S. PATENT DOCUMENTS 10,860,958 B2 * 12/2020 Choi .............. G06Q 10/063114
2008/0209417 A1 * 8/2008 Jakobson .............. G06F 9/4856
718/100

(Continued)

FOREIGN PATENT DOCUMENTS

| CN | 105323147 A | 2/2016 |
| CN | 105591881 A | 5/2016 |

(Continued)

OTHER PUBLICATIONS

CN Office Action in Application No. 201810380005.X dated Dec. 16, 2019.

(Continued)

*Primary Examiner* — Kieu D Vu
*Assistant Examiner* — Rami R Okasha
(74) *Attorney, Agent, or Firm* — Maschoff Brennan

(57) ABSTRACT

Provided in the present disclosure are a message management method and terminal, the method comprising: receiving a first input of an operating body for a target message on a group communication interface; in response to the first input, displaying a message management widget, the message management widget comprising processing progress information of the target message; when a processing feedback message of at least one message receiving subject for the target message is received, updating display content of the message management widget.

13 Claims, 17 Drawing Sheets

(56) References Cited

U.S. PATENT DOCUMENTS

| | | | |
|---|---|---|---|
| 2009/0016504 A1 | 1/2009 | Mantell et al. | |
| 2010/0287023 A1* | 11/2010 | Knobel | G06Q 10/06311 |
| | | | 705/7.13 |
| 2013/0262527 A1* | 10/2013 | Hunter | G06F 3/0484 |
| | | | 707/805 |
| 2014/0280603 A1 | 9/2014 | Rideout et al. | |
| 2015/0363092 A1* | 12/2015 | Morton | H04M 1/72436 |
| | | | 715/752 |
| 2016/0188197 A1* | 6/2016 | Ryu | G06F 3/002 |
| | | | 345/156 |
| 2017/0124531 A1* | 5/2017 | McCormack | G06F 3/04845 |
| 2017/0168692 A1* | 6/2017 | Chandra | G06F 3/017 |
| 2017/0330120 A1* | 11/2017 | Zhang | G06Q 10/109 |
| 2017/0359281 A1 | 12/2017 | Yip et al. | |
| 2018/0067914 A1* | 3/2018 | Chen | G06Q 10/06315 |
| 2018/0097902 A1* | 4/2018 | Meixner | H04L 51/04 |
| 2018/0098206 A1 | 4/2018 | Nguyen | |
| 2018/0152407 A1* | 5/2018 | Soni | H04L 51/34 |
| 2018/0173389 A1* | 6/2018 | Hull | G06F 3/0484 |
| 2018/0302231 A1* | 10/2018 | Sung | H04M 1/72436 |
| 2019/0132405 A1* | 5/2019 | Song | H04L 51/32 |
| 2019/0196693 A1* | 6/2019 | Yang | H04L 51/226 |
| 2020/0059444 A1* | 2/2020 | Liu | H04L 51/046 |
| 2021/0044556 A1 | 2/2021 | Cui et al. | |
| 2021/0224718 A1* | 7/2021 | Nishimura | G06Q 10/06316 |

FOREIGN PATENT DOCUMENTS

| | | |
|---|---|---|
| CN | 106100972 A | 11/2016 |
| CN | 106354504 A | 1/2017 |
| CN | 106789586 A | 5/2017 |
| CN | 106951139 A | 7/2017 |
| CN | 107465592 A | 12/2017 |
| CN | 107508691 A | 12/2017 |
| CN | 107682254 A | 2/2018 |
| CN | 108563378 A | 9/2018 |
| WO | 2014002704 A1 | 1/2014 |

OTHER PUBLICATIONS

CN Search Report in Application No. 201810380005.X dated Nov. 19, 2018.

Written Opinion and International Search Report in Application No. PCT/CN2019/083431 dated Nov. 5, 2020.

EP Search Report in Application No. 19791451.8 dated May 20, 2021.

* cited by examiner

METHOD OF MANAGING PROCESSING PROGRESS OF A MESSAGE IN A GROUP COMMUNICATION INTERFACE AND TERMINAL

CROSS-REFERENCE TO RELATED APPLICATION

This application is a continuation application of PCT Application No. PCT/CN2019/083431 filed on Apr. 19, 2019, which claims priority to Chinese Patent No. 201810380005.X filed in China on Apr. 25, 2018, which is incorporated herein by reference in its entirety.

TECHNICAL FIELD

Embodiments of the present disclosure relate to the field of communications technologies, and in particular, to a message management method and terminal.

BACKGROUND

With popularization of terminals such as mobile phones and tablets, contact between people relies more and more on social communication software in the terminals, and people join more and more communication groups. When a user sends, to a communication group, a message that needs to be processed by other users, the user needs to learn processing progress of the message in time. However, as the communication group has numerous messages, the user often needs to constantly pay attention to messages in a group communication interface, or search related messages from the numerous messages one by one. Otherwise, the user may not be able to learn in time or even miss some processing progress of the message. It can be learned that the problem of relatively complicated and cumbersome operation exists when the user learns the processing progress of the message in the communication group in related technologies.

SUMMARY

According to a first aspect, an embodiment of the present disclosure provides a message management method applied to a terminal, where the method includes:

receiving a first input that is performed on a target message on a group communication interface by an operator;

displaying a message management control in response to the first input, where the message management control includes information about processing progress of the target message; and updating display content of the message management control in the case of receiving a processing feedback message of at least one message receiving object for the target message.

According to a second aspect, an embodiment of the present disclosure further provides a terminal, including: a processor, a memory, and a computer program stored in the memory and executable on the processor, where the computer program, when executed by the processor, implements steps of the foregoing message management method.

According to a third aspect, an embodiment of the present disclosure further provides a computer readable storage medium, storing a computer program, where the computer program, when executed by a processor, implements steps of the foregoing message management method.

DETAILED DESCRIPTION

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
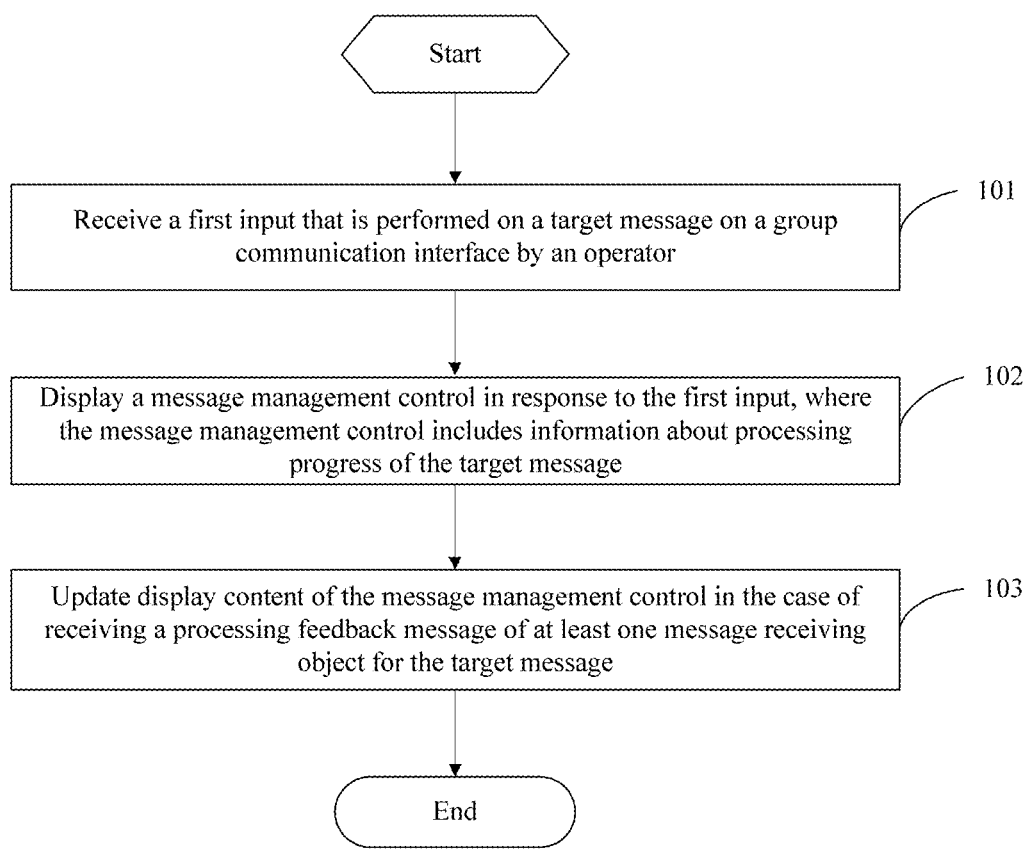
FIG. 1 is a flowchart of a message management method according to an embodiment of the present disclosure.

Referring to FIG. 1, FIG. 1 is a flowchart of a message management method according to an embodiment of the present disclosure. As shown in FIG. 1, the message management method is applied to a terminal, and is used to manage a target message in a group communication interface, and specifically, used to manage processing progress of the target message. The method includes the following steps:

Step 101: Receive a first input that is performed on the target message on the group communication interface by an operator.

Figure 2:
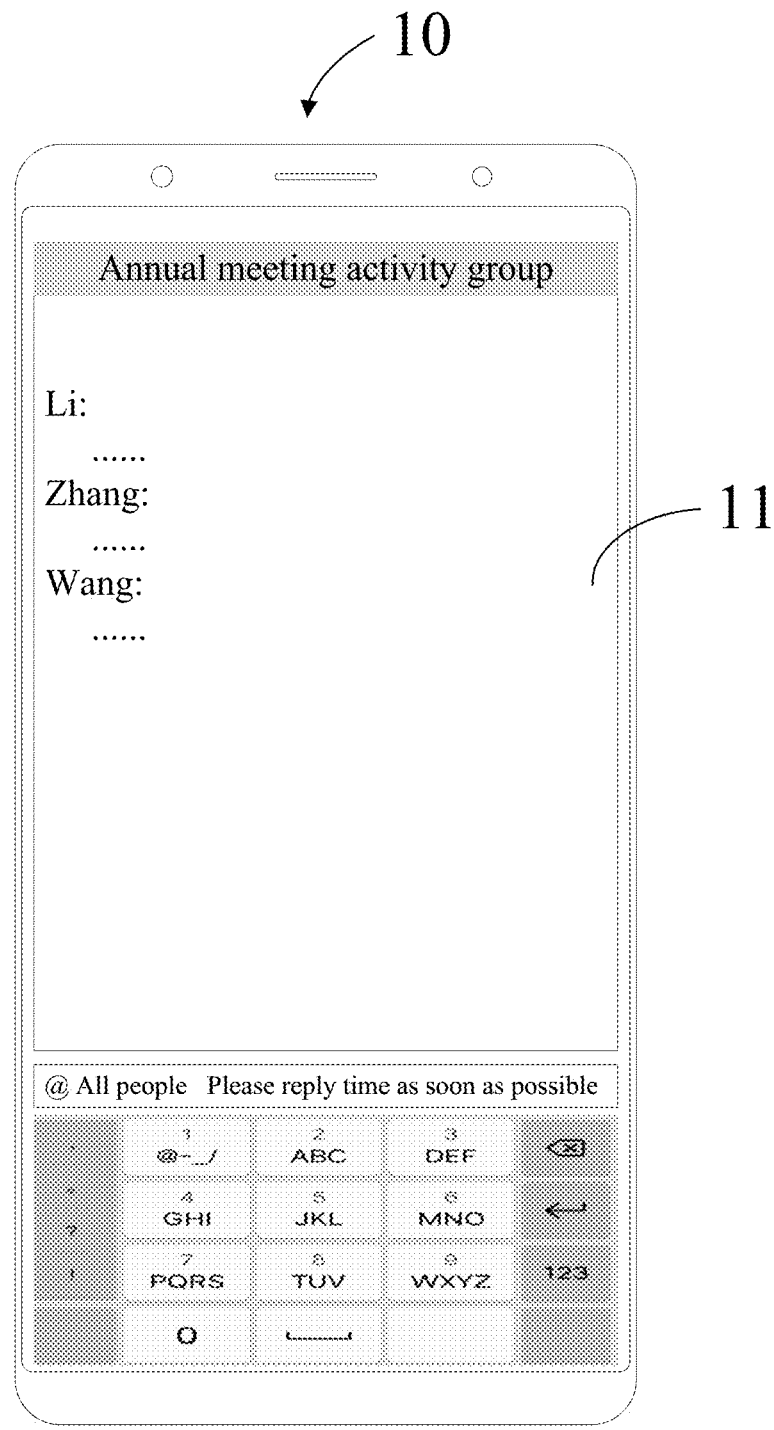
FIG. 2 is a first schematic diagram of a display interface according to an embodiment of the present disclosure.

In this embodiment of the present disclosure, the target message may be a message that has been sent or a message to be sent. The group communication interface is a dialogue interface of a communication group or a chat interface of a communication group, where the communication group is a group including at least three communication accounts. In specific implementation, a group communication interface 11 of a terminal 10 is shown in FIG. 2, but is not limited to this.

The target message selected by the first input may be one message, or two or more messages, which is not limited in this embodiment of the present disclosure.

In this way, a user can freely and flexibly select, through the first input, the target message that needs to be managed, so that the user's need for message management can be met.

The first input may be the user's voice input, or the user's motion-sensing input, or a touch input by an operator such as the user, a touch pen, or a stylus on a touch panel of the terminal. The touch input may include: a tap operation, a double-tap operation, a multi-tap operation, a long-press operation, a touch and hold operation, a slide operation, and the like. When a display of the terminal is a special-shaped screen, the first input may be a double-finger touch operation that is performed on two "ear areas" of the special-shaped screen by the user's two fingers simultaneously, for example, a double-finger tap operation or a double-finger slide operation.

Optionally, before Step 101, the method further includes:

receiving a second input that is performed on the group communication interface by the operator; and displaying a message selection control on a preset side of the target message on the group communication interface in response to the second input.

The second input may be a touch operation of the operator on the group communication interface, for example, tapping, double-tapping, or long-pressing a group identifier (such as a group name or a group image) on the group communication interface. After the terminal receives the second input, it can trigger the terminal to display the message selection control on the side of the message sent by the user, where the message selection control is configured for the user to select the target message that needs to be added to a message management task.

The first input in Step 101 acts on the message selection control corresponding to the target message, for example, tapping, double-tapping, or long-pressing the message selection control corresponding to the target message.

In this way, by displaying the message selection control, the user can more intuitively select the target message that needs to be managed, so as to improve operability of selecting the target message.

Figure 3:
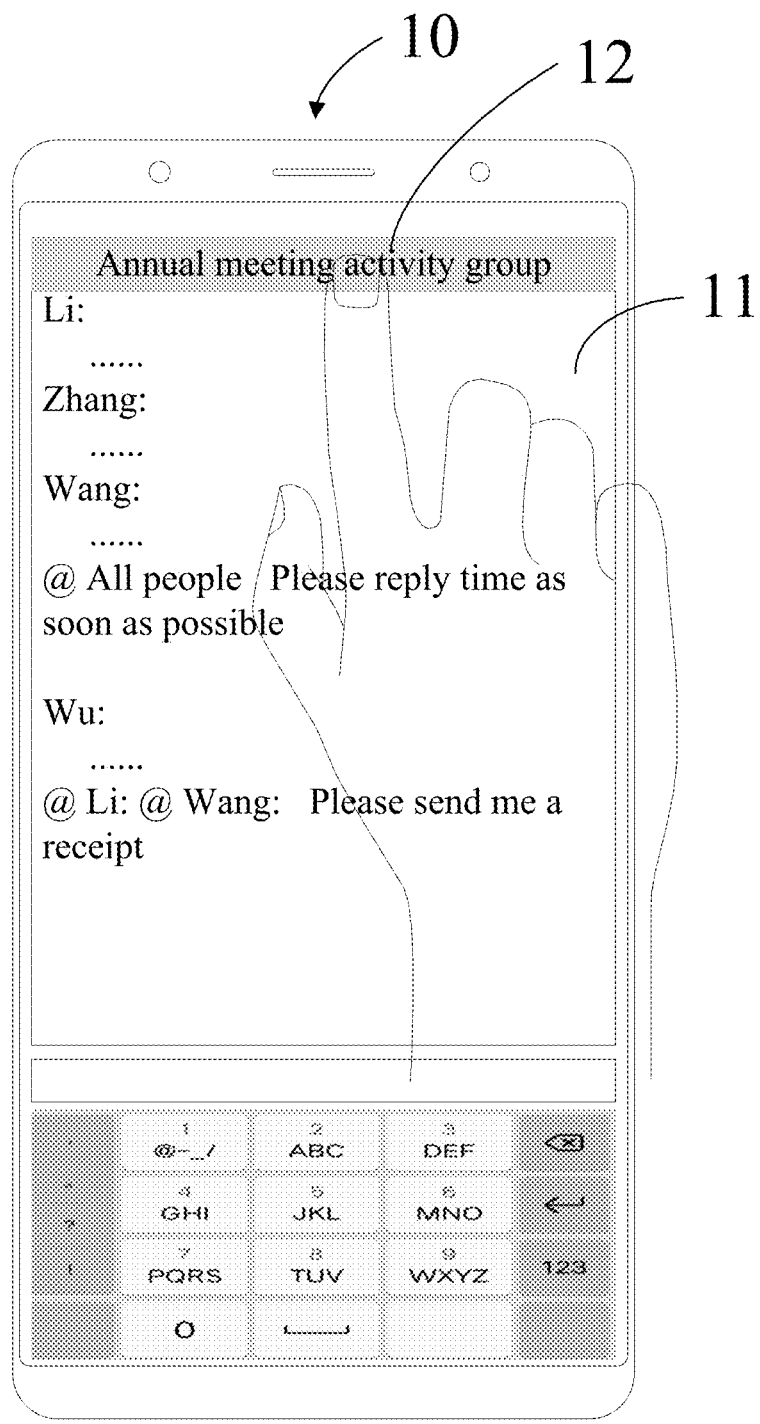
FIG. 3 is a second schematic diagram of a display interface according to an embodiment of the present disclosure.
Figure 4:
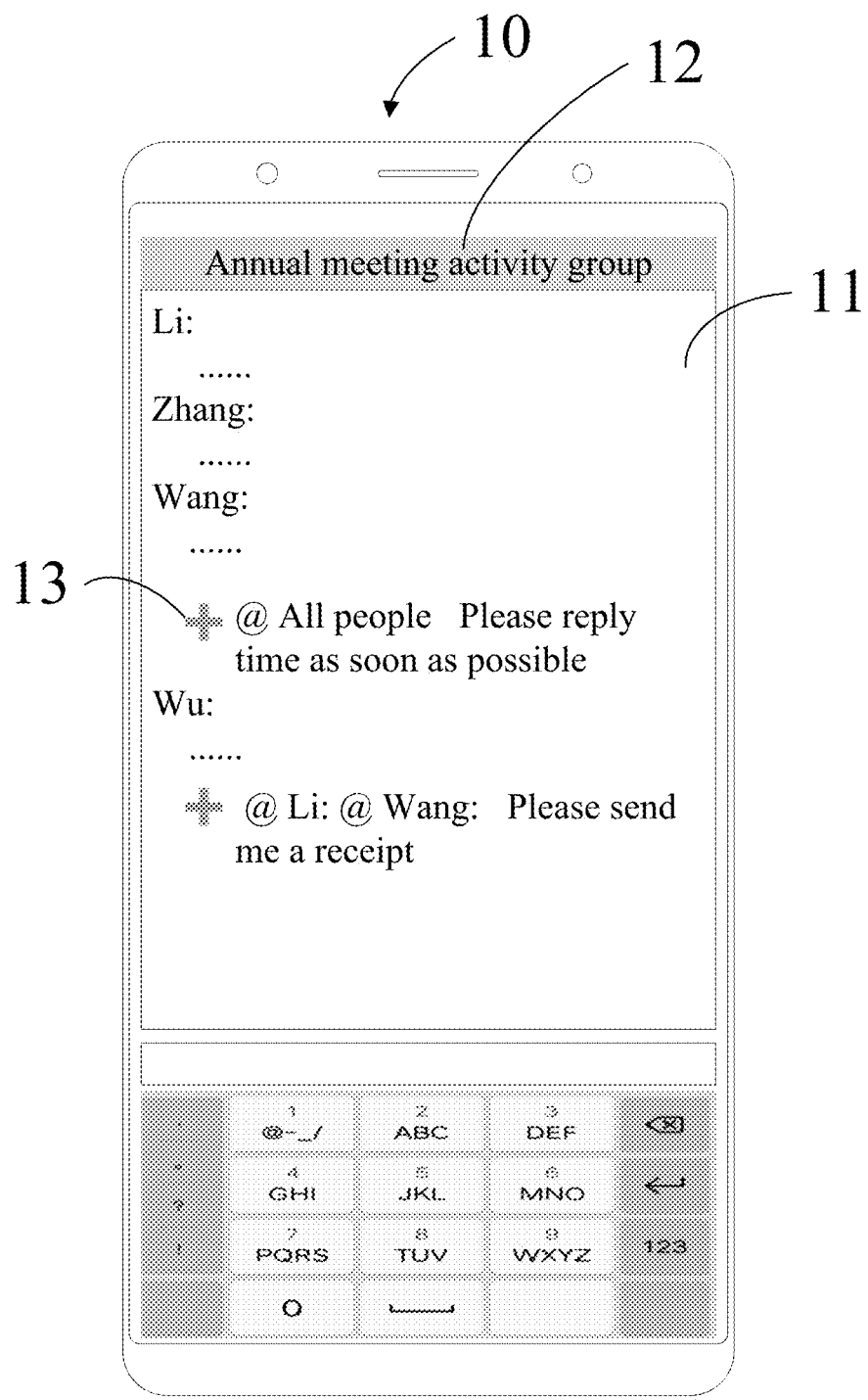
FIG. 4 is a third schematic diagram of a display interface according to an embodiment of the present disclosure.

In specific implementation, corresponding display interfaces are shown in FIG. 3 and FIG. 4, but are not limited to these. In FIG. 3, a user taps, double-taps, or long-presses a group identifier 12 of the group communication interface 11. As shown in FIG. 4, a message selection control 13 is displayed on a left side of a message sent by the user. In FIG. 4, the message selection control 13 is indicated as "+". The current user can tap, double-tap, or long-press message selection controls 13 of one or more messages, to add one or more target messages to a message management task. Colors of the message selection controls 13 may be different, so as to indicate whether a message is selected by the user. For example, a color of a message selection control 13 corresponding to a target message that is selected by the user is black, and a color of a message selection control 13 corresponding to a message that is not selected by the user is gray. In addition, when the user needs to remove a target message from the message management task, the user can tap, double-tap, or long-press message selection controls 13 of one or more messages again. In this case, the color of the message selection control 13 can change from black to gray.

Generally, every message sent by the user will be sent to every communication account in the communication group. If there is an "@" indicator in the message, it indicates that the message is a message that is sent to a specific message receiving object, and the message may need to be accordingly processed by the specific message receiving object. For example, if there is an "@ All people" indicator in the message, it indicates that the message receiving objects of the message are all members (except the message sender). If there is an "@ one or more users" indicator in the message, it indicates that the message receiving object of the message is one or more users after the "@" indicator. If there is no "@" indicator in the message, it indicates that the message receiving objects of the message are all members by default.

In addition to the foregoing case in which the target message has corresponding default message receiving objects, the user can also select message receiving objects corresponding to the target message through the first input. In other words, the first input further includes a selection operation of selecting message receiving objects corresponding to the target message. For example, when there is no "@" indicator in the target message, the user can select the message receiving objects corresponding to the target message through the first input.

In specific implementation, after selecting the target message, the user can drag, on the group communication interface, an avatar of one or more communication accounts to a preset position, which indicates that an object corresponding to the dragged communication account is used as the message receiving object corresponding to the target message.

In this way, a user can freely and flexibly select, through the first input, the message receiving object corresponding to the target message, so that the user's need for message management can be met better.

Step 102: Display a message management control in response to the first input, where the message management control includes information about processing progress of the target message.

In this embodiment of the present disclosure, a quantity of message management controls may be related to a quantity of target messages. For example, when the quantity of the target message is 1, the quantity of the message management control may also be 1; and when the quantity of the target messages is 2, the quantity of the message management controls may also be 2.

When there are a plurality of message management controls, the plurality of message management controls may be arranged side by side in a vertical direction or displayed side by side in a horizontal direction. When there are a plurality of message management controls, a corresponding number can be displayed on each message management control. When the user performs a tap operation, a double-tap operation, a long-press operation, or a slide operation on the numbers, the terminal can display content of the target message corresponding to the message management control or content of the message processing progress corresponding to the target message.

Figure 5:
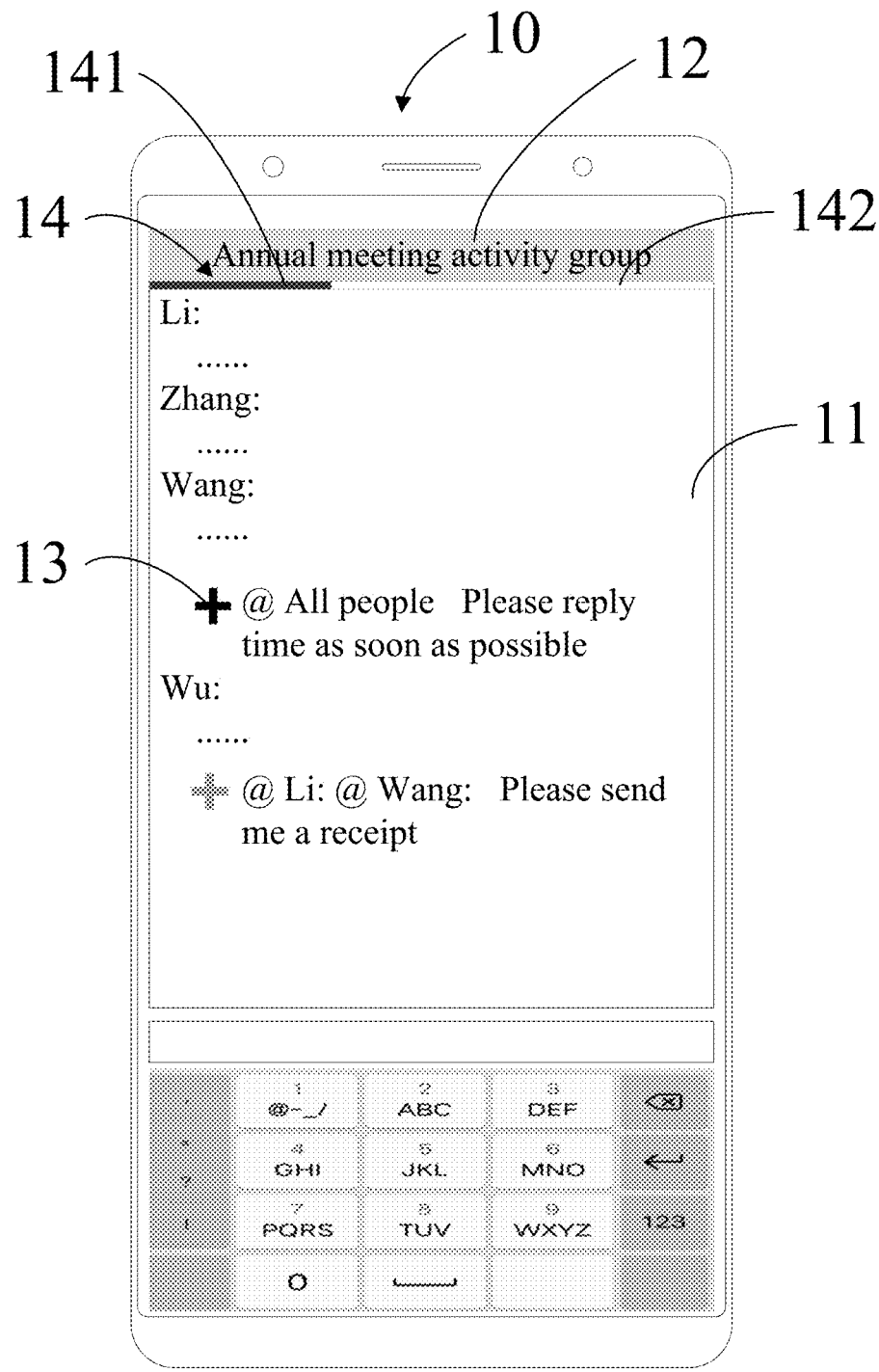
FIG. 5 is a fourth schematic diagram of a display interface according to an embodiment of the present disclosure.

In specific implementation, as shown in FIG. 5, after the user selects the target message, the terminal can display a message management control 14 on the current group communication interface 11. The message management control 14 is displayed in an area in which the group identifier 12 of the group communication interface 11 is located.

In this embodiment of the present disclosure, by displaying the message management control, the user can view the message processing progress or detailed message processing information at any time by operating the message management control. In addition, by using the message management control, centralized management of the message processing progress is facilitated.

Step 103: Update display content of the message management control in the case of receiving a processing feedback message of at least one message receiving object for the target message.

In this embodiment of the present disclosure, if a message receiving object processes the target message, the terminal can receive the processing feedback message of the message receiving object for the target message, and update the display content of the message management control.

The message receiving object processes the target message, including at least one of the following (but is not limited to this):

The message receiving object views the target message.
The message receiving object replies the target message.
The message receiving object forwards the target message.
The message receiving object shares the target message.

In this embodiment of the present disclosure, the message processing progress of the target message is reflected by updating the display content of the message management control, so that the user can more intuitively learn the message processing progress of the target message.

Optionally, the method further includes:

outputting prompt information when all message receiving objects have processed the target message.

The prompt information is used to prompt that the processing progress of the target message is fully completed. The prompt information may be voice prompt information (such as voice broadcast or ringtone), character or icon prompt information displayed on the display of the terminal, or the like.

In specific implementation, when all the message receiving objects have processed the target message, display the prompt information (for example, a "✓" mark) on the message management control or at the edge of the message management control.

In this way, through the foregoing solution, the user can learn the message processing progress of the target message in time, so that the user's need for message management can be met better.

The message management control may include a progress bar control or a tag control.

The message management control 14 may be a progress bar control, and may include a first progress segment 141 and a second progress segment 142. The first progress segment 141 may indicate a first type of a message receiving object, and the first type of the message receiving object is a message receiving object that has processed the target message; and the second progress segment 142 may indicate a second type of a message receiving object, and the second type of the message receiving object is a message receiving object that has not processed the target message. A first ratio of a first length of the first progress segment 141 to a second length of the second progress segment 142 may be equal to a second ratio of a first quantity of the first type of the message receiving object to a second quantity of the second type of the message receiving object.

In this way, by segmenting the progress bar control, the user can conveniently distinguish the two types of message receiving objects.

In addition, to enhance visual effects, colors of the first progress section 141 and the second progress section 142 may be different. For example, the color of the first progress section 141 may be green, and the color of the second progress section 142 may be red; or the color of the first progress segment 141 may be black, and the color of the second progress segment 142 may be white; or the like.

As a quantity of a message receiving object that processes the target message increases, a display status of the message management control is also updated. In this way, the user can more intuitively learn the message processing progress of the target message. In addition, the message management control is set as the progress bar control. Because an area occupied by the progress bar control is small, normal display of other content is not affected.

Figure 6:
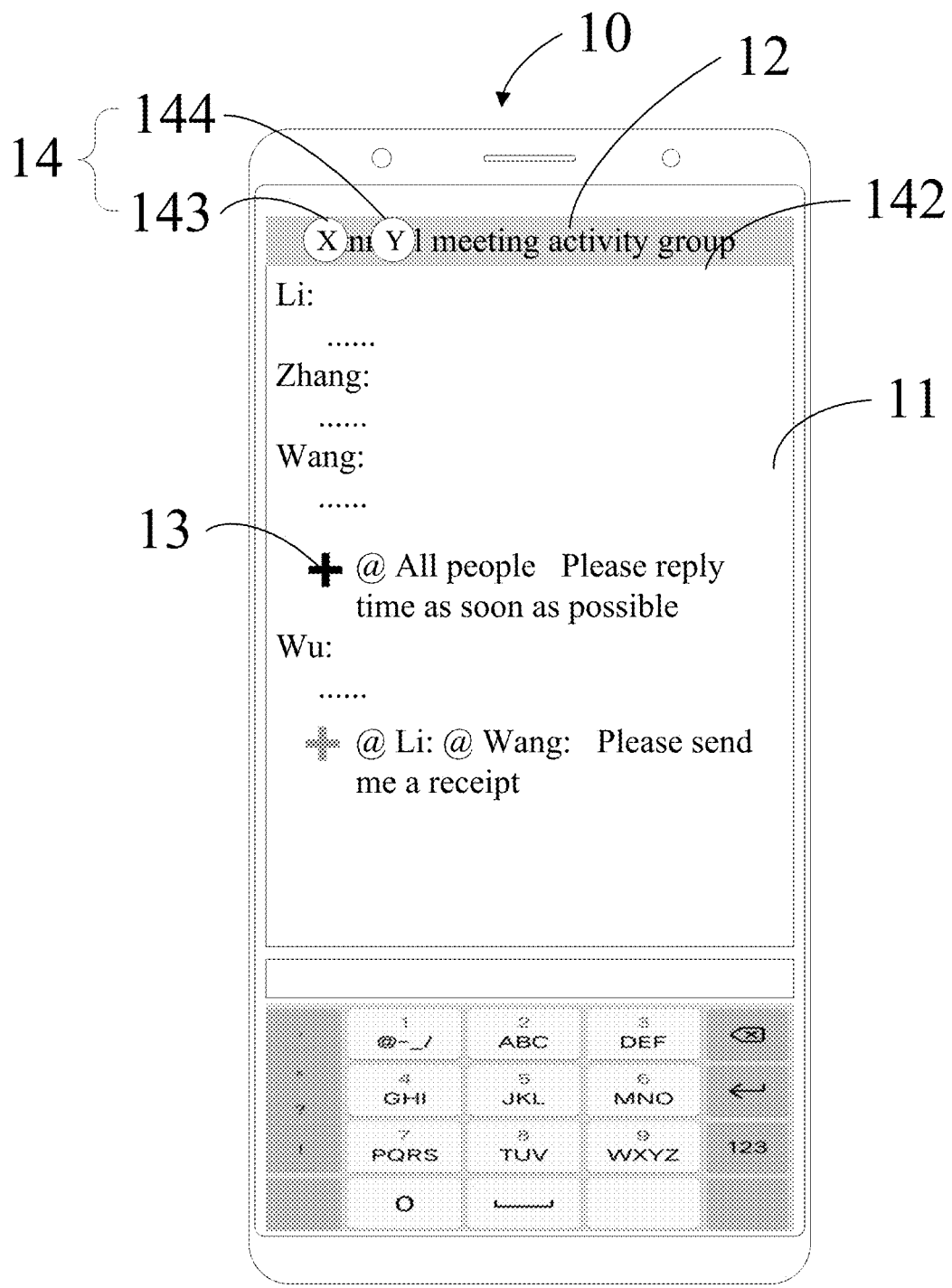
FIG. 6 is a fifth schematic diagram of a display interface according to an embodiment of the present disclosure.

As shown in FIG. 6, the message management control 14 may be a tag control. The message management control 14 may include a first sub-tag 143 and a second sub-tag 144. The first sub-tag 143 displays a first quantity X of a message receiving object that has processed the target message, and the second sub-tag 144 displays a second quantity Y of a message receiving object that has not processed the target message.

In this way, by segmenting the tag control into two sub-controls, the user can conveniently distinguish two types of message receiving objects.

In addition, to enhance visual effects, colors of the first sub-tag 143 and the second sub-tag 144 may be different. For example, the first sub-tag 143 is indicated by green, and the second sub-tag 144 is indicated by red.

As a quantity of a message receiving object that processes the target message increases, the first quantity displayed on the first sub-tag 143 increases, and the second quantity displayed on the second sub-tag 144 decreases. In this way, the quantity of the message receiving object is represented by the quantities on the sub-tags, so that the user can more intuitively learn the message processing progress of the target message, and the user's need for message management can be met better. In addition, the message management control is set as the tag control. Because an area occupied by the tag control is small, normal display of other content is not affected.

Optionally, after the displaying a message management control, the method further includes:

receiving a third input that is performed on the message management control by the operator; and displaying a floating window in response to the third input, where the floating window includes detailed message processing information of a message receiving object corresponding to the third input.

The third input may be a touch operation on the message management control, for example, a tap operation, a double-tap operation, a long-press operation, or a slide operation.

Figure 7:
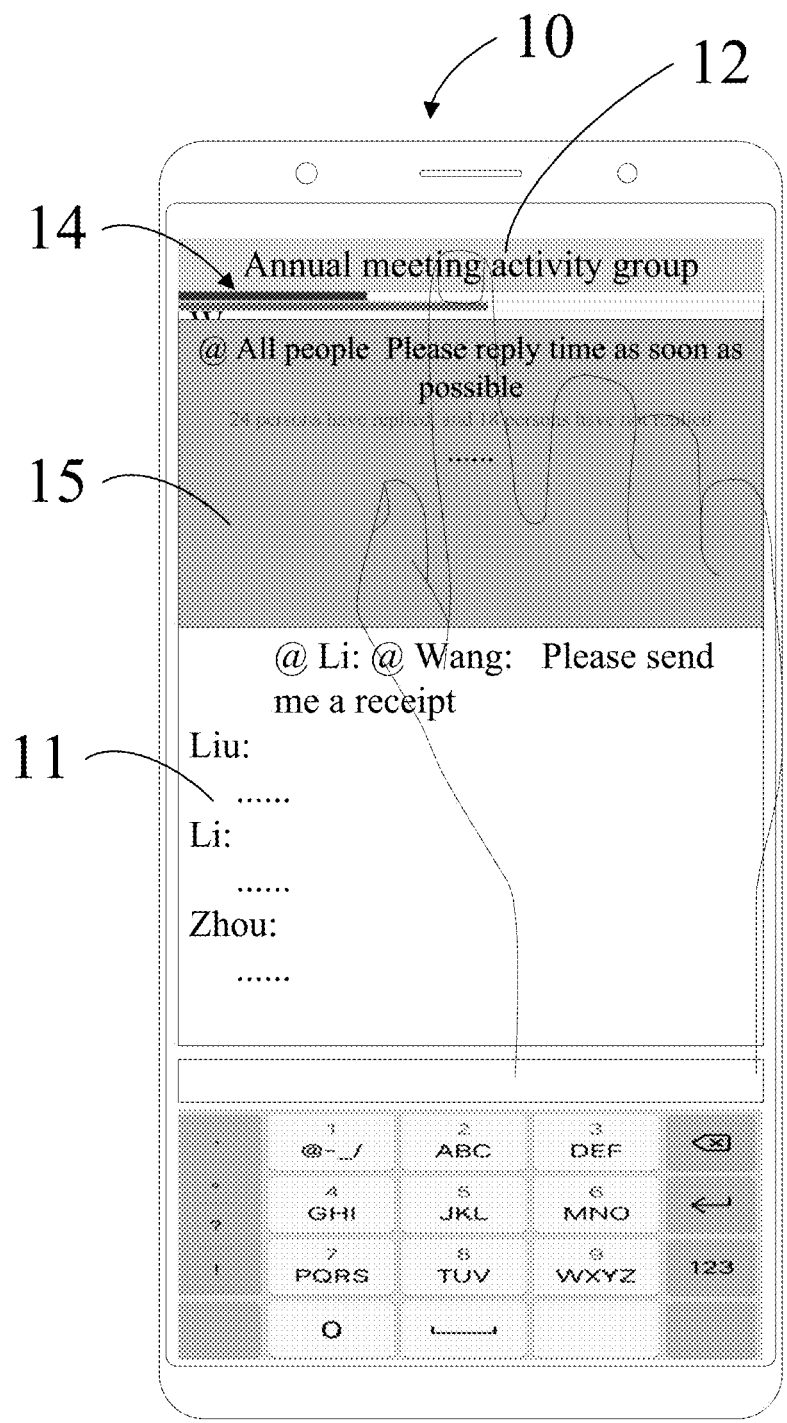
FIG. 7 is a sixth schematic diagram of a display interface according to an embodiment of the present disclosure.
Figure 8:
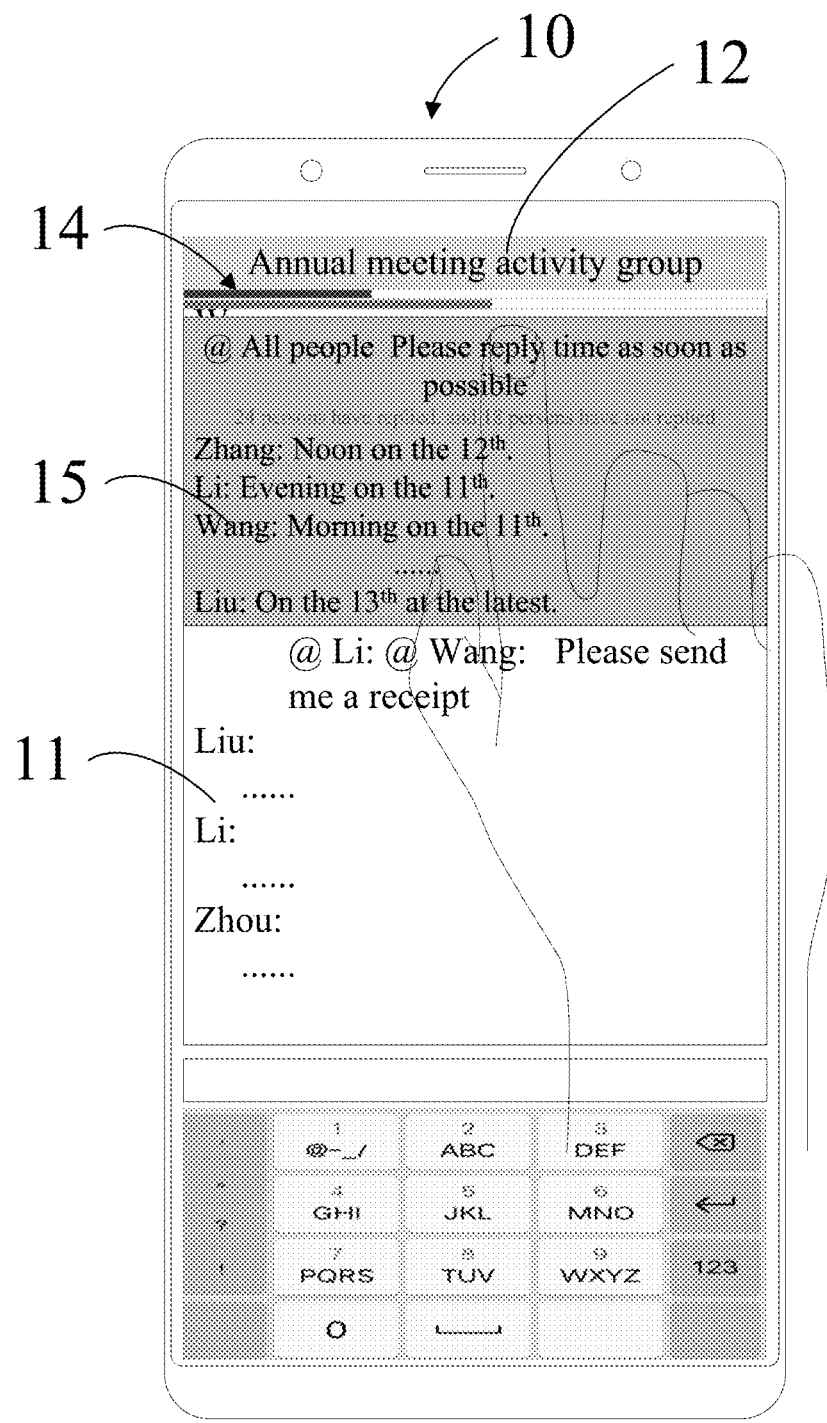
FIG. 8 is a seventh schematic diagram of a display interface according to an embodiment of the present disclosure.

In specific implementation, as shown in FIG. 7, the user can slide down at the position where the message management control 14 is located. In an area below the message management control 14, a floating window 15 is displayed. Content of the target message is displayed in the floating window 15. If there are a plurality of target messages, content of the plurality of target messages are displayed. As shown in FIG. 8, when the user taps one of the target messages, message processing progress corresponding to the target message is displayed in the floating window 15. Specifically, detailed message processing information of a message receiving object for the target message can be displayed.

When there are more processing information of the message receiving object for the target message, the floating window 15 cannot display all the processing information. Then, the user can slide on the floating window 15 to turn pages on the floating window to display the detailed message processing information of the message receiving object for the target message.

Using that the message management control is the progress bar control as an example, the receiving a third input that is performed on the message management control by the operator includes:

receiving the third input by the operator by sliding along the first progress segment of the progress bar control; and respectively displaying, in the floating window, detailed message processing information of message receiving objects, corresponding to different positions in the first progress segment, for the target message.

Generally, different positions in the first progress segment indicate different message receiving objects, and the different message receiving objects are generally arranged from left to right in sequence in the first progress segment based on a time sequence of processing the target messages. Therefore, the user can slide along the first progress segment of the progress bar control, to learn specific detailed message processing information of the message receiving object for the target message.

Figure 9:
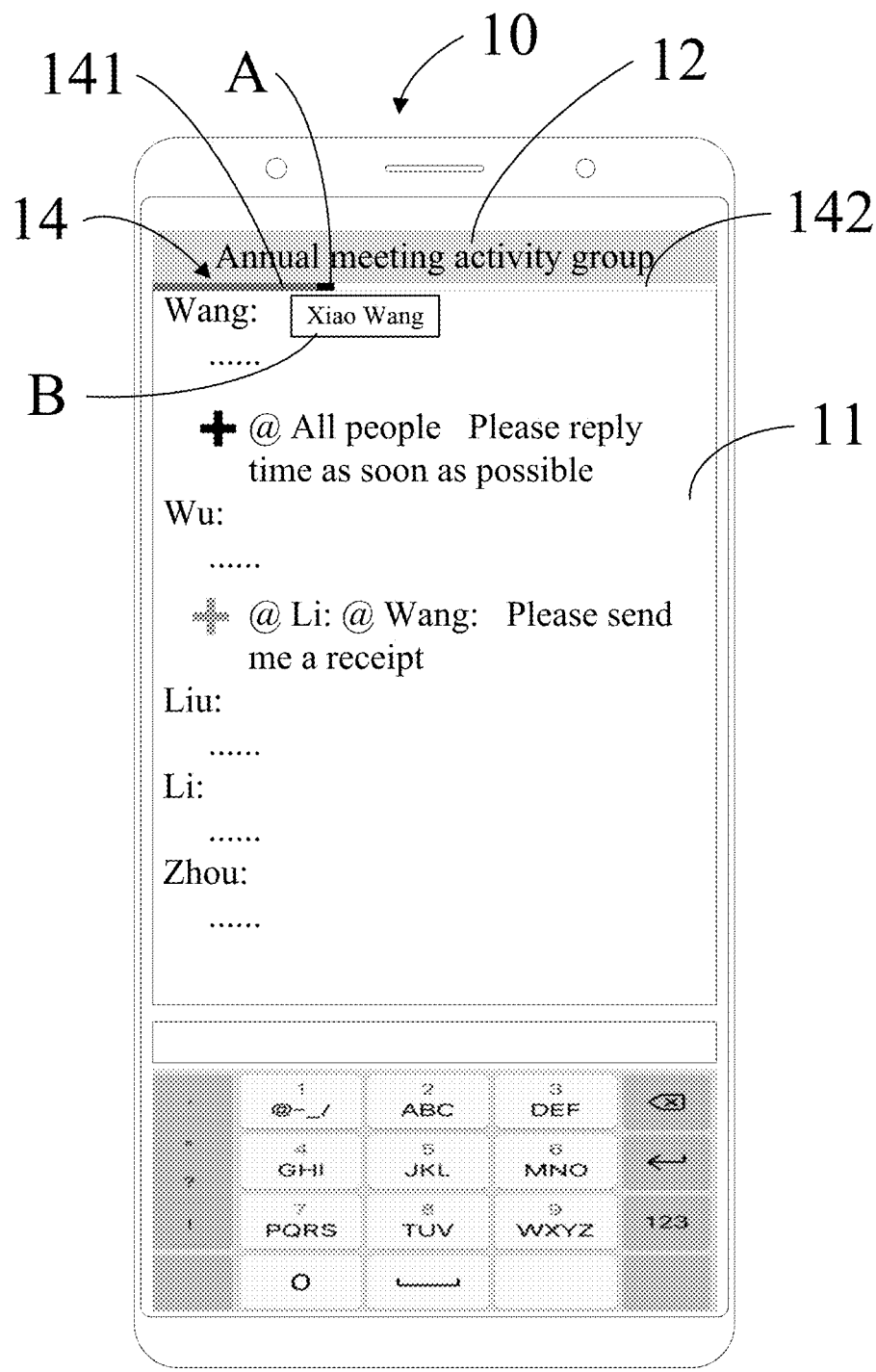
FIG. 9 is an eighth schematic diagram of a display interface according to an embodiment of the present disclosure.

In specific implementation, the user can use a stylus or a touch pen to slide along the first progress segment of the progress bar control. Through the stylus or the touch pen, at least one of an object identifier of a specific message receiving object and detailed message processing information of the message receiving object for the target message can be selected or displayed more accurately. For example, as shown in FIG. 9, when the stylus or the touch pen slides to a position A of the first progress segment, the terminal displays an object identifier of a message receiving object B "Xiao Wang" corresponding to the position A or detailed message processing information of a message receiving object B "Xiao Wang" for the target message.

When there are more content of the detailed message processing information of the message receiving object B for the target message, for example, when the message receiving object B replies the target message, the terminal may display only the object identifier of the message receiving object B and corresponding message processing prompt information. If the user needs to view detailed reply of the message receiving object B for the target message, the user can use the stylus or the touch pen to drag from the position A to a main display area or a main operation area of the terminal, to expand and display the detailed reply of the message receiving object B for the target message in the main display area or the main operation area.

In this way, through the third input that is performed on the message management control, the user can learn the detailed message processing information of the message receiving object for the target message, so that the user's need for message management can be met better.

Optionally, after the displaying a message management control, the method further includes:

receiving a fourth input that is performed on the message management control by the operator; and sending, in response to the fourth input, the target message to a message receiving object corresponding to the target area.

The target area is associated with at least one message receiving object. The fourth input may be a touch operation on the message management control, for example, a tap operation, a double-tap operation, a long-press operation, or a slide operation.

In this embodiment of the present disclosure, after the message management task is established for a period of time, if there are still message receiving objects that have not processed the target message, then the user can separately send the target message to these message receiving objects again through the fourth input, so as to avoid affecting the message processing progress of the target message. In addition, the user can directly operate in the target area on the message management control without entering a message program to copy and paste a message that has been sent, which is convenient to operate.

Figure 10:
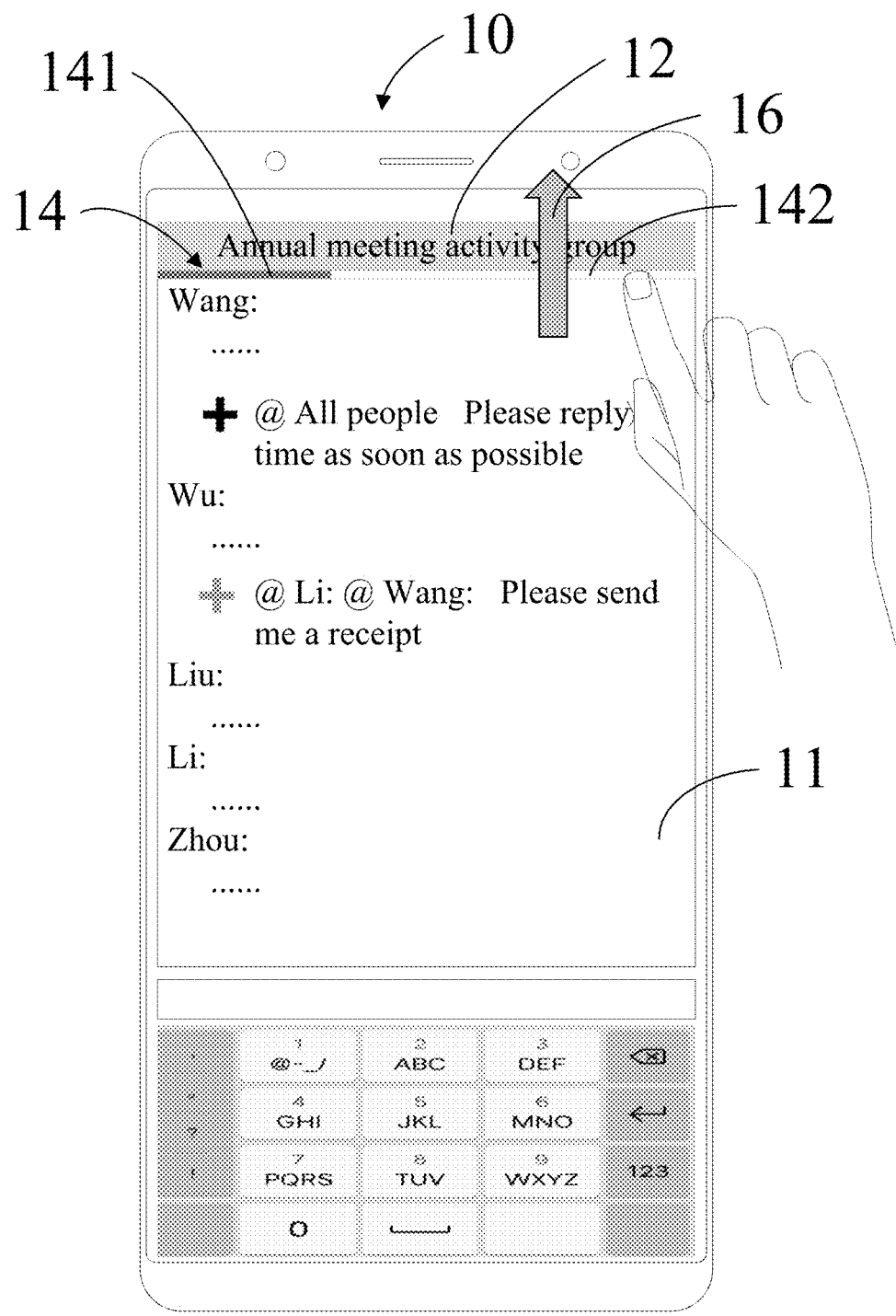
FIG. 10 is a ninth schematic diagram of a display interface according to an embodiment of the present disclosure.
Figure 11:
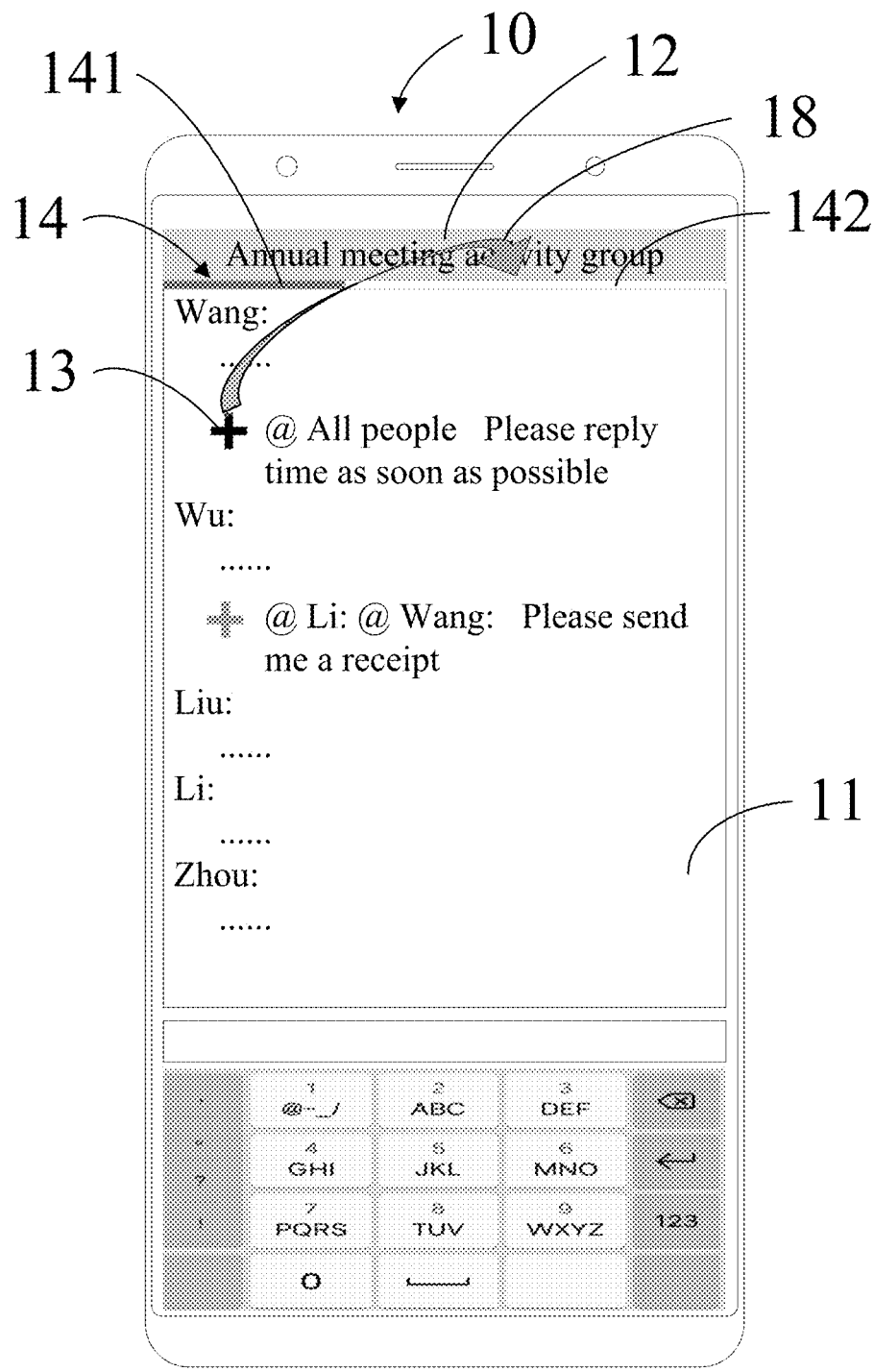
FIG. 11 is a tenth schematic diagram of a display interface according to an embodiment of the present disclosure.

In specific implementation, using that the message management control is the progress bar control as an example, as shown in FIG. 10, the fourth input may be a touch operation of long-pressing the second progress segment 142 of the message management control 14 and sliding upwards (as shown by an arrow 16 in FIG. 10). As shown in FIG. 11, the fourth input may be a touch operation of dragging the message selection control 13 to the second progress segment 142 (as shown by an arrow 18 in FIG. 11).

In specific implementation, using that the message management control is the tag control as an example, the fourth input may be a touch operation of long-pressing the second sub-tag and sliding upwards.

In this way, through the fourth input that is performed on the message management control, the user can send the target message again to promote that the message processing progress is completed as soon as possible, so that the user's need for message management can be met better.

Optionally, the method further includes:

when a display interface is switched from a first display interface to a second display interface, displaying the message management control on the second display interface.

Figure 12:
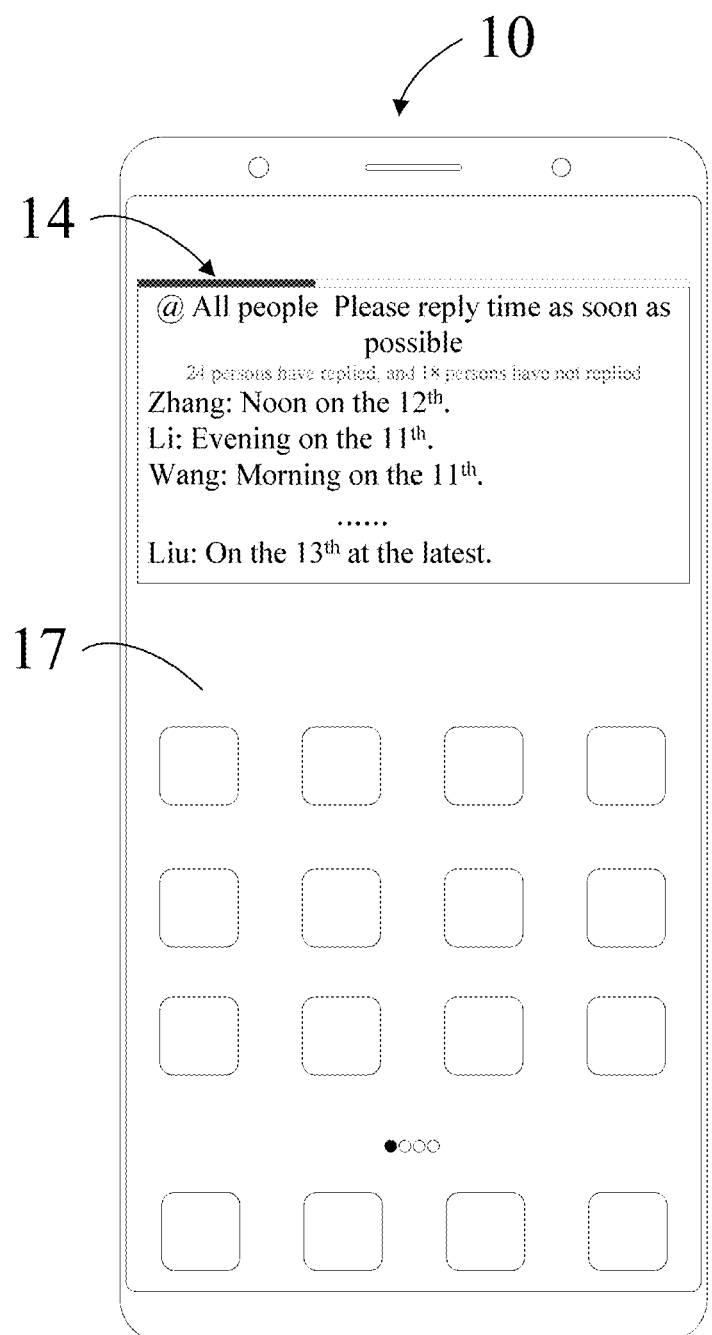
FIG. 12 is an eleventh schematic diagram of a display interface according to an embodiment of the present disclosure.

For example, when the current display interface is the group communication interface, the message management control can be displayed on the group communication interface. When the user exits the current group communication interface to a main application interface, the message management control can be displayed on the main application interface. When the user exits the current group communication interface to a desktop 17 of the terminal, the message management control 14 can be displayed on the desktop 17 of the terminal (as shown in FIG. 12).

In this way, the user can view the message processing progress of the target message on any display interface of the terminal, so that the user can conveniently learn the message processing progress of the target message at any time, and the user's need for message management can be met better.

Optionally, when the user performs a tap operation, a double-tap operation, a long-press operation, or a slide operation on the message management control, or drags the message management control to a specific position at a specific track or at a specific speed, the message management control may be hidden.

Optionally, a display area of the message management control includes at least one of the following (but is not limited to this):

an area in which a group identifier of the group communication interface is located;

ear areas of a special-shaped screen;

curved areas of a curved screen;

a foldable area of a flexible foldable screen;

a back screen area of the terminal; and a display area of a wearable device associated with the terminal.

FIG. 5 shows an implementation in which the message management control is displayed in the area in which the group identifier of the group communication interface is located.

Figure 13:
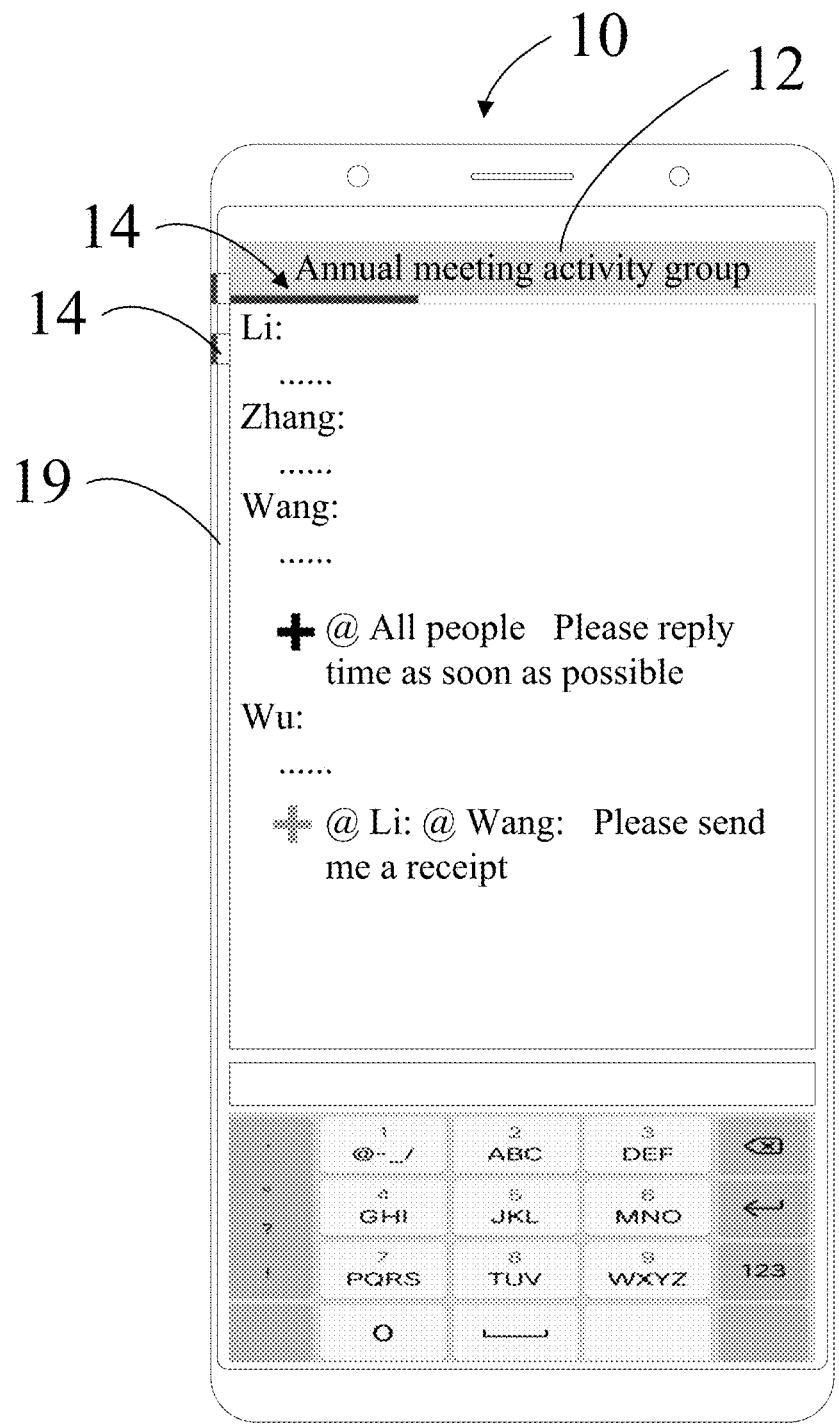
FIG. 13 is a twelfth schematic diagram of a display interface according to an embodiment of the present disclosure.
Figure 14:
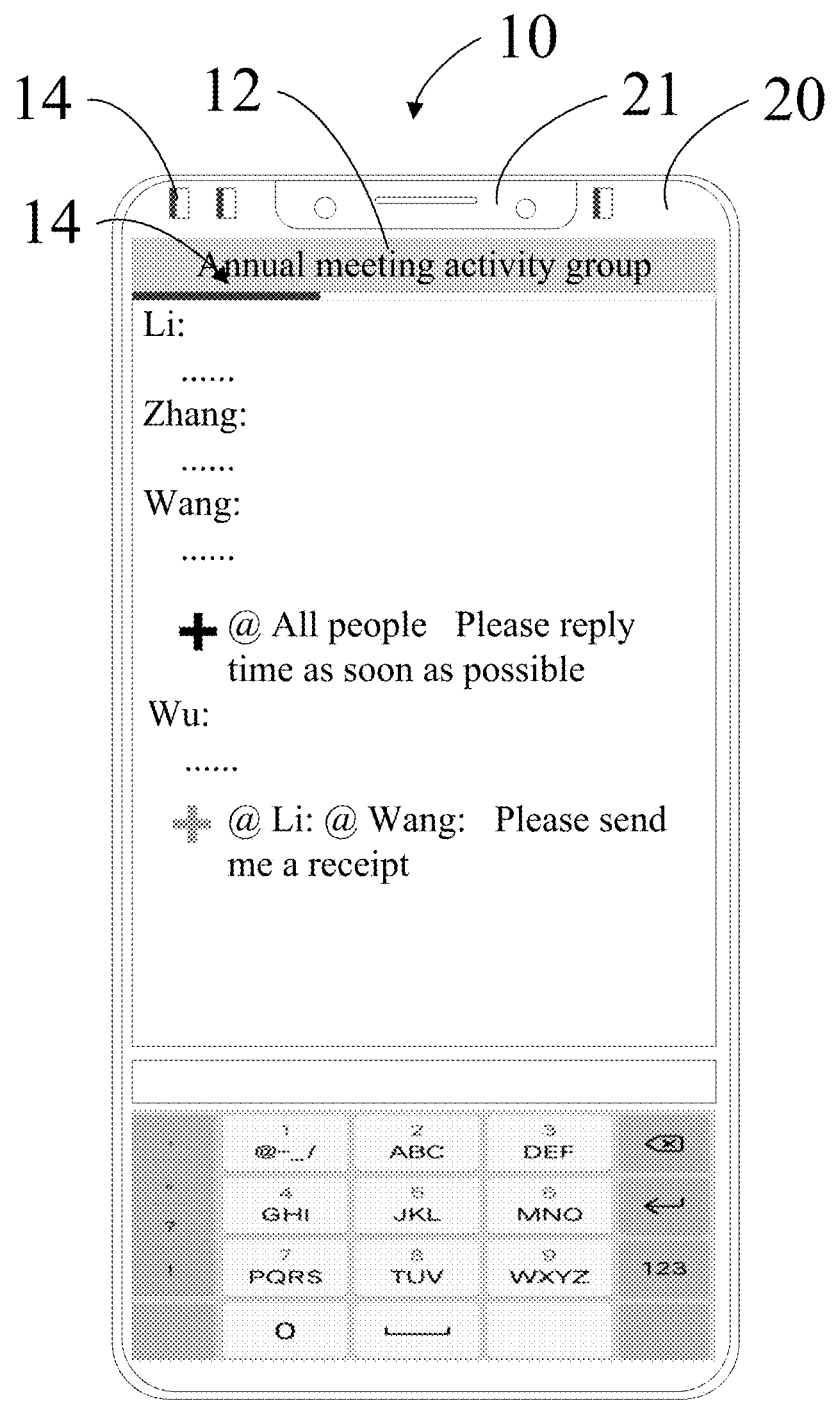
FIG. 14 is a thirteenth schematic diagram of a display interface according to an embodiment of the present disclosure.
Figure 15:
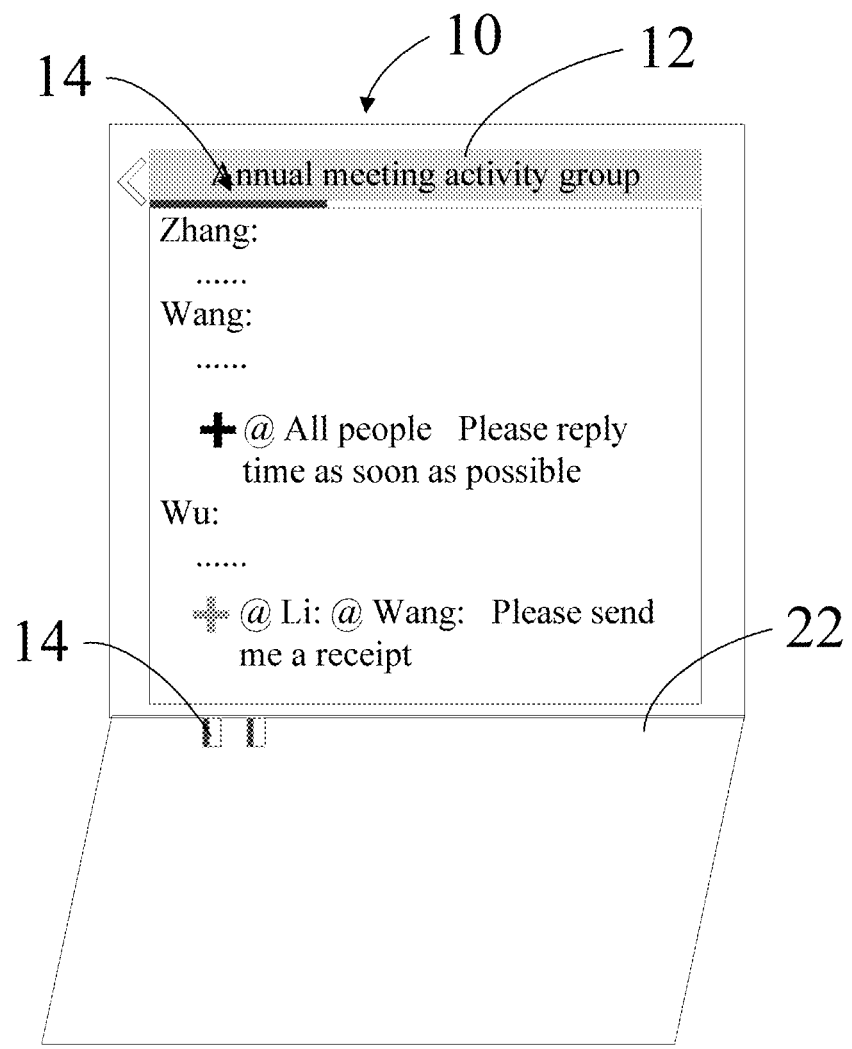
FIG. 15 is a fourteenth schematic diagram of a display interface according to an embodiment of the present disclosure.

The terminal can automatically display a message management control based on a type of a display. For example, as shown in FIG. 13, if the display is a curved screen, the terminal can automatically display the message management control 14 in a curved area 19 on either side of the curved screen. For example, as shown in FIG. 14, if the display is a special-shaped screen, the terminal can automatically display the message management control 14 in at least one of two ear areas 20 of the special-shaped screen. In FIG. 14, the special-shaped screen may be referred to as a display having a bang area 21. The bang area 21 is specifically a non-display area concaved at the top of the display and configured to set a camera and the like. Areas on two sides of the bang area 21 are usually referred to as the ear areas 20. For example, as shown in FIG. 15, if the display is a flexible foldable screen, the terminal can display the message management control 14 in a foldable area 22 of the flexible foldable screen. In addition, when the position of the foldable area 22 changes, the message management control 14 also moves accordingly, so that the message management control 14 is always located at the edge of a normal visual field without affecting use and view of a normal window.

The message management control can also be displayed in a back screen area of the terminal. In this way, the message management control does not occupy display space of the main screen and does not affect use and view of a normal window.

The message management control can also be displayed in a display area of a wearable device associated with the terminal. In this way, the user does not need to carry the terminal, and can learn the processing progress of the target message through the wearable device associated with the terminal, so that the user's need for message management can be met better.

In addition, the terminal can also determine a display position of the message management control based on the user's operation (such as a drag operation or a slide operation).

In this embodiment of the present disclosure, in addition to displaying the processing progress of the target message through the message management control, the processing progress of the target message can also be displayed through a message management window. The following briefly describes a specific implementation of the message management window.

The message management window can be displayed on the display of the terminal in a form of a floating window. In this way, the user can leave a social application for other operations. When the user needs to view the message processing progress of the target message, the user can view and operate the message management window without opening the social application. The message management window may also be a semi-transparent floating window. In this way, display of the message management window cannot completely cover other display content in an area covered by the message management window.

Optionally, the message management window displays an object identifier of a message receiving object. In this way, the user can quickly position a specific user through the message management window.

The message management window can display object identifiers of all message receiving objects, or only object identifiers of message receiving objects that have processed the target message, or only object identifiers of message receiving objects that have not processed the target message. For example, when a quantity of a message receiving object that has processed the target message is less than a quantity of a message receiving object that has not processed the target message, the message management window can display only an object identifier of the message receiving object that has processed the target message.

When the message management window can display only the object identifier of the message receiving object that has processed the target message, each time a new message receiving object processes the target message, an object identifier of the new message receiving object can be displayed in the message management window in a manner such as highlighting, blinking, enlarging, or changing color.

Optionally, the method further includes:

receiving a fifth input that is performed on a target object identifier by the operator; and displaying detailed message processing information of a message receiving object corresponding to the target object identifier.

The fifth input may be a touch operation on the target object identifier, for example, a tap operation, a double-tap operation, a long-press operation, or a slide operation. In this way, through the sixth input that is performed on the target object identifier, the user can learn the detailed processing information of the message receiving object for the target message, so that the user's need for message management can be met better.

In this implementation, the message processing progress of the target message is managed through the floating message management window, and centralized management of the message processing progress is facilitated. In addition, the message processing progress of the target message is reflected by updating display content of the message management window, so that the user can more intuitively learn the message processing progress of the target message.

Optionally, message processing progress of a plurality of target messages can be managed simultaneously in the message management window. The message management window can be triggered and generated when the user selects a first target message. After that, when adding another target message, the user can directly add the another target message to the message management window to manage the message processing progress.

It should be noted that in this embodiment of the present disclosure, the implementation related to the message management control can also be applied to the message management window, and the same beneficial effects can be achieved. To avoid repetition, details are not described herein again.

In this embodiment of the present disclosure, the foregoing terminal may be any device having a communication function, such as: a computer, a mobile phone, a tablet personal computer, a laptop computer, a personal digital assistant (PDA), a mobile Internet device (MID), or a wearable device.

In this embodiment of the present disclosure, the first input that is performed on the target message on the group communication interface by the operator is received; the message management control is displayed in response to the first input, where the message management control includes the information about the processing progress of the target message; and the display content of the message management control is updated in the case of receiving a processing feedback message of the at least one message receiving object for the target message. In this way, when a message receiving object processes the target message in a communication group, the information about the processing progress of the target message can be displayed through the message management control. Therefore, the user can quickly learn the processing progress of the target message through the message management control. It can be learned that compared with the related technologies, this embodiment of the present disclosure can manage the processing progress of the target message in the communication group more simply and conveniently.

Figure 16:
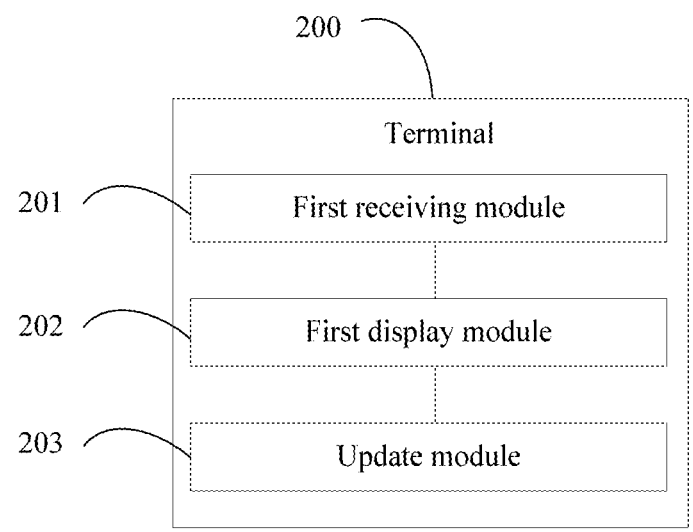
FIG. 16 is a structural diagram of a terminal according to an embodiment of the present disclosure.

Referring to FIG. 16, FIG. 16 is a structural diagram of a terminal according to an embodiment of the present disclosure. As shown in FIG. 16, the terminal 200 includes a first receiving module 201, a first display module 202, and an update module 203.

The first receiving module 201 is configured to receive a first input that is performed on a target message on a group communication interface by an operator.

The first display module 202 is configured to display a message management control in response to the first input, where the message management control includes information about processing progress of the target message.

The update module 203 is configured to update display content of the message management control in the case of receiving a processing feedback message of at least one message receiving object for the target message.

Optionally, the terminal further includes:
a second receiving module, configured to receive a second input that is performed on the group communication interface by the operator; and
a second display module, configured to display a message selection control on a preset side of the target message on the group communication interface in response to the second input, where
the first input acts on the message selection control corresponding to the target message.

Optionally, the terminal further includes:
a third receiving module, configured to receive a third input that is performed on the message management control by the operator; and
a third display module, configured to display a floating window in response to the third input, where the floating window includes detailed message processing information of a message receiving object corresponding to the third input.

Optionally, the terminal further includes:
a fourth receiving module, configured to receive a fourth input that is performed on the message management control by the operator; and
a sending module, configured to send, in response to the fourth input, the target message to a message receiving object corresponding to the target area, where the target area is associated with at least one message receiving object.

Optionally, the terminal further includes:
a switch module, configured to, when a display interface is switched from a first display interface to a second display interface, display the message management control on the second display interface.

Optionally, a display area of the message management control includes at least one of the following:
an area in which a group identifier of the group communication interface is located;
ear areas of a special-shaped screen;
curved areas of a curved screen;
a foldable area of a flexible foldable screen;
a back screen area of the terminal; and
a display area of a wearable device associated with the terminal.

Optionally, the message management control includes a progress bar control or a tag control.

Optionally, the message management control is a progress bar control, and the progress bar control includes a first progress segment and a second progress segment; and a first ratio of a first length of the first progress segment to a second length of the second progress segment is equal to a second ratio of a first quantity of a first type of a message receiving object to a second quantity of a second type of a message receiving object, where the first type of the message receiving object is a message receiving object that has processed the target message, and the second type of the message receiving object is a message receiving object that has not processed the target message.

Optionally, the message management window is a tag control, and the tag control includes a first sub-tag and a second sub-tag;
the first sub-tag displays a first quantity of a message receiving object that has processed the target message; and
the second sub-tag displays a second quantity of a message receiving object that has not processed the target message.

Optionally, the first input further includes a selection operation of selecting message receiving objects corresponding to the target message.

The terminal 200 can implement the processes implemented by the terminal in the method embodiments of FIG. 1 to FIG. 15. To avoid repetition, details are not described herein again.

The terminal 200 in this embodiment of the present disclosure receives the first input that is performed on the target message on the group communication interface by the operator; displays the message management control in response to the first input, where the message management control includes the information about the processing progress of the target message; and updates the display content of the message management control in the case of receiving a processing feedback message of the at least one message receiving object for the target message. In this way, when a message receiving object processes the target message in a communication group, the processing progress of the target message can be displayed through the message management control. Therefore, a user can quickly learn the processing progress of the target message through the message management control. It can be learned that compared with the related technologies, this embodiment of the present disclosure can manage the processing progress of the target message in the communication group more simply and conveniently.

Figure 17:
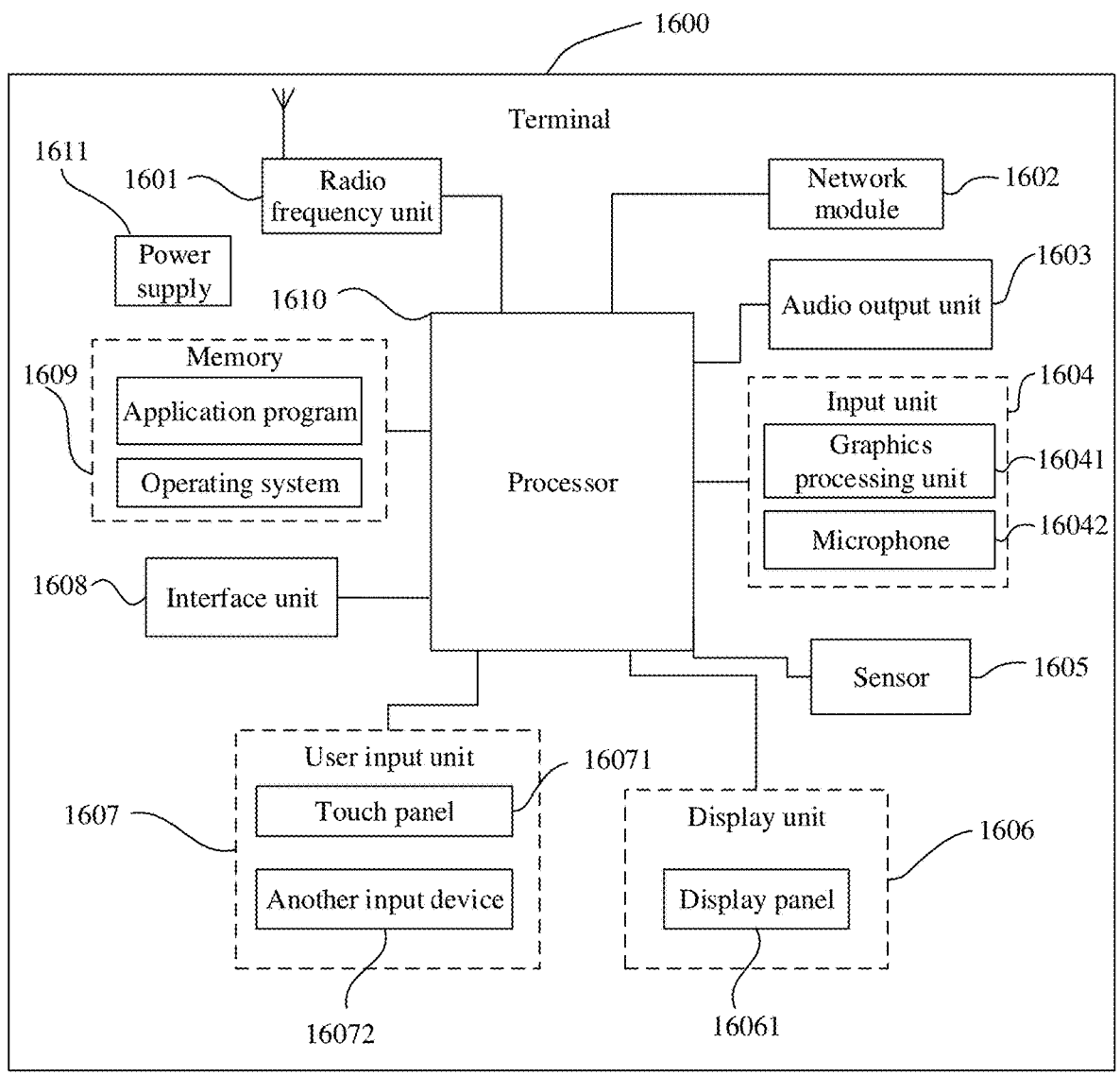
FIG. 17 is a structural diagram of another terminal according to an embodiment of the present disclosure.

FIG. 17 is a schematic structural diagram of hardware of a terminal implementing embodiments of the present disclosure. The terminal 1600 includes but is not limited to: a radio frequency unit 1601, a network module 1602, an audio output unit 1603, an input unit 1604, a sensor 1605, a display unit 1606, a user input unit 1607, an interface unit 1608, a memory 1609, a processor 1610, a power supply 1611, and other components. A person skilled in the art can understand that the structure of the terminal shown in FIG. 17 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet personal computer, a notebook computer, a palmtop computer, a vehicle-mounted terminal, a wearable device, a pedometer, or the like.

The processor 1610 is configured to:

receive a first input that is performed on a target message on a group communication interface by an operator;

display a message management control in response to the first input, where the message management control includes information about processing progress of the target message; and update display content of the message management control in the case of receiving a processing feedback message of at least one message receiving object for the target message.

Optionally, the processor 1610 is further configured to:

receive a second input that is performed on the group communication interface by the operator; and display a message selection control on a preset side of the target message on the group communication interface in response to the second input, where the first input acts on the message selection control corresponding to the target message.

Optionally, the processor 1610 is further configured to:

receive a third input that is performed on the message management control by the operator; and display a floating window in response to the third input, where the floating window includes detailed message processing information of a message receiving object corresponding to the third input.

Optionally, the processor 1610 is further configured to:

receive a fourth input that is performed on the message management control by the operator; and send, in response to the fourth input, the target message to a message receiving object corresponding to the target area, where the target area is associated with at least one message receiving object.

Optionally, the processor 1610 is further configured to:

when a display interface is switched from a first display interface to a second display interface, display the message management control on the second display interface.

Optionally, a display area of the message management control includes at least one of the following:

an area in which a group identifier of the group communication interface is located;

ear areas of a special-shaped screen;

curved areas of a curved screen;

a foldable area of a flexible foldable screen;

a back screen area of the terminal; and a display area of a wearable device associated with the terminal.

Optionally, the message management control includes a progress bar control or a tag control.

Optionally, the message management control is a progress bar control, and the progress bar control includes a first progress segment and a second progress segment; and a first ratio of a first length of the first progress segment to a second length of the second progress segment is equal to a second ratio of a first quantity of a first type of a message receiving object to a second quantity of a second type of a message receiving object, where the first type of the message receiving object is a message receiving object that has processed the target message, and the second type of the message receiving object is a message receiving object that has not processed the target message.

Optionally, the message management window is a tag control, and the tag control includes a first sub-tag and a second sub-tag;

the first sub-tag displays a first quantity of a message receiving object that has processed the target message; and the second sub-tag displays a second quantity of a message receiving object that has not processed the target message.

Optionally, the first input further includes a selection operation of selecting message receiving objects corresponding to the target message.

In this embodiment of the present disclosure, the first input that is performed on the target message on the group communication interface by the operator is received; the message management control is displayed in response to the first input, where the message management control includes the information about the processing progress of the target message; and the display content of the message management control is updated in the case of receiving a processing feedback message of the at least one message receiving object for the target message. In this way, when a message receiving object processes the target message in a communication group, the information about the processing progress of the target message can be displayed through the message management control. Therefore, a user can quickly learn the processing progress of the target message through the message management control. It can be learned that compared with the related technologies, this embodiment of the present disclosure can manage the processing progress of the target message in the communication group more simply and conveniently.

It should be understood that, in this embodiment of the present disclosure, the radio frequency unit 1601 can be configured to receive and transmit information, or receive and transmit signals during a call. Specifically, the radio frequency unit 1601 receives downlink data from a base station, and transmits the downlink data to the processor 1610 for processing; and in addition, transmits uplink data to the base station. Generally, the radio frequency unit 1601 includes but is not limited to an antenna, at least one amplifier, a transceiver, a coupler, a low noise amplifier, a duplexer, and the like. In addition, the radio frequency unit 1601 can also communicate with another device through a wireless communications system and network.

The terminal provides a user with wireless broadband Internet access through the network module 1602, for example, helps the user send and receive emails, browse web pages, and access streaming media.

The audio output unit 1603 can convert audio data received by the radio frequency unit 1601 or the network module 1602 or stored in the memory 1609 into an audio signal, and output the audio signal into sound. In addition, the audio output unit 1603 can also provide audio output related to a specific function performed by the terminal 1600 (for example, call signal receiving sound and message receiving sound). The audio output unit 1603 includes a speaker, a buzzer, a receiver, and the like.

The input unit 1604 is configured to receive an audio signal or a video signal. The input unit 1604 may include a graphics processing unit (GPU) 16041 and a microphone 16042. The graphics processing unit 16041 is configured to process image data of a static picture or a video obtained by an image capture apparatus (for example, a camera) in video capture mode or image capture mode. A processed image frame can be displayed on the display unit 1606. The image frame processed by the graphics processing unit 16041 can be stored in the memory 1609 (or another storage medium) or sent via the radio frequency unit 1601 or the network module 1602. The microphone 16042 can receive sound and can process such sound into audio data. Processed audio data can be converted, in telephone call mode, into a format that can be sent to a mobile communication base station via the radio frequency unit 1601 for output.

The terminal 1600 further includes at least one sensor 1605, for example, a light sensor, a motion sensor, and other sensors. Specifically, the light sensor includes an ambient light sensor and a proximity sensor. The ambient light sensor can adjust a brightness of a display panel 16061 based on a brightness of ambient light. The proximity sensor can close the display panel 16061 and/or backlight when the terminal 1600 moves to an ear. As a motion sensor, an accelerometer sensor can detect magnitude of acceleration in various directions (usually three axes), can detect magnitude and the direction of gravity when stationary, and can be configured for identification of terminal postures (such as horizontal and vertical screen switch, related games, and magnetometer posture calibration), vibration identification of related functions (such as the pedometer and percussion), and the like. The sensor 1605 may further include a fingerprint sensor, a pressure sensor, an iris sensor, a molecular sensor, a gyroscope, a barometer, a hygrometer, a thermometer, an infrared sensor, or the like. Details are not described herein.

The display unit 1606 is configured to display information input by the user or information provided to the user. The display unit 1606 may include the display panel 16061, and the display panel 16061 may be configured in a form of a liquid crystal display (LCD), an organic light-emitting diode (OLED), or the like.

The user input unit 1607 can be configured to receive input numeric or character information, and generate key signal inputs related to user settings and function control of the terminal. Specifically, the user input unit 1607 includes a touch panel 16071 and another input device 16072. The touch panel 16071, also called a touch screen, can collect a touch operation of the user on or near the touch panel 16071 (For example, the user uses any suitable object or accessory such as a finger or a stylus to operate on or near the touch panel 16071). The touch panel 16071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 1610, receives a command sent by the processor 1610, and executes the command In addition, the touch panel 16071 can be implemented in various types such as resistive, capacitive, infrared, and surface acoustic wave. In addition to the touch panel 16071, the user input unit 1607 may further include the another input device 16072. Specifically, the another input device 16072 may include but is not limited to a physical keyboard, function keys (such as a volume control key and a switch key), a trackball, a mouse, and a joystick. Details are not described herein.

Further, the touch panel 16071 can cover the display panel 16061. When detecting a touch operation on or near the touch panel 16071, the touch panel 16071 transmits the touch operation to the processor 1610 to determine a type of a touch event. Then the processor 1610 provides corresponding visual output on the display panel 16061 based on the type of the touch event. Although in FIG. 16, the touch panel 16071 and the display panel 16061 are configured as two independent components to implement input and output functions of the terminal, in some embodiments, the touch panel 16071 and the display panel 16061 can be integrated to implement the input and output functions of the terminal. Details are not limited herein.

The interface unit 1608 is an interface for connecting an external apparatus to the terminal 1600. For example, the external apparatus may include a wired or wireless headphone port, an external power supply (or a battery charger) port, a wired or wireless data port, a storage card port, a port for connecting an apparatus having an identification module, an audio input/output (I/O) port, a video I/O port, a headphone port, or the like. The interface unit 1608 can be configured to receive an input (for example, data information and power) from the external apparatus and transmit the received input to one or more elements in the terminal 1600, or transmit data between the terminal 1600 and the external apparatus.

The memory 1609 can be configured to store software programs and various data. The memory 1609 may mainly include a program storage area and a data storage area. The program storage area may store an operating system, an application program required by at least one function (such as a sound playback function and an image playback function), and the like. The data storage area may store data (such as audio data and a phone book) created based on the use of the mobile phone, and the like. In addition, the memory 1609 may include a high-speed random access memory or a nonvolatile memory, for example, at least one disk storage device, a flash memory, or another volatile solid-state storage device.

The processor 1610 is a control center of the terminal, connects various parts of the entire terminal by using various interfaces and circuits, and performs various functions of the terminal and processes data by running or executing software programs and/or modules stored in the memory 1609 and invoking data stored in the memory 1609, so as to monitor the terminal as a whole. The processor 1610 may include one or more processing units. Optionally, the processor 1610 may integrate an application processor with a modem processor. The application processor mainly processes the operating system, a user interface, the application program, and the like, and the modem processor mainly processes wireless communication. It can be understood that the foregoing modem processor may not be integrated into the processor 1610.

The terminal 1600 may further include the power supply 1611 (for example, a battery) configured to supply power to various components. Optionally, the power supply 1611 may be logically connected to the processor 1610 through a power management system, so as to implement functions such as managing charging, discharging, and power consumption through the power management system.

In addition, the terminal 1600 includes some function modules not shown. Details are not described herein.

Optionally, an embodiment of the present disclosure further provides a terminal, including the processor 1610, the memory 1609, and a computer program stored in the memory 1609 and executable on the processor 1610, where the computer program, when executed by the processor 1610, implements the processes of the foregoing embodiments of the message management method, and the same technical effects can be achieved. To avoid repetition, details are not described herein again.

An embodiment of the present disclosure further provides a computer readable storage medium, storing a computer program, where the computer program, when executed by a processor, implements the processes of the foregoing embodiments of the message management method, and the same technical effects can be achieved. To avoid repetition, details are not described herein again.

The computer readable storage medium may be a read-only memory (ROM), a random access memory (RAM), a magnetic disk, a compact disc, or the like.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. Without being subject to further limitations, an element defined by a phrase "including a" does not exclude presence of other identical elements in the process, method, article, or apparatus that includes the very element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is a preferred embodiment. Based on such an understanding, the technical solutions of the present disclosure essentially, or the part contributing to the related technologies may be implemented in a form of a computer software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A message management method applied to a terminal, comprising:
    receiving a first input that is performed on a target message on a group communication interface by an operator;
    displaying a message management control in response to the first input, wherein the message management control comprises information about processing progress of the target message; and
    updating display content of the message management control in the case of receiving a processing feedback message of at least one message receiving object for the target message;
    wherein different positions in the message management control indicate different respective message receiving objects;
    wherein after the displaying the message management control, the method further comprises:
    receiving a third input that is performed on the message management control by the operator; and
    displaying a floating window in response to the third input, wherein the floating window comprises detailed information about processing of the target message by only a message receiving object corresponding to a position of the third input on the message management control;
    wherein the message management control is a progress bar control, and the progress bar control comprises a first progress segment and a second progress segment; and
    a first ratio of a first length of the first progress segment to a second length of the second progress segment is equal to a second ratio of a first quantity of a first type of a message receiving object to a second quantity of a second type of a message receiving object, wherein the first type of the message receiving object is a message receiving object that has processed the target message, and the second type of the message receiving object is a message receiving object that has not processed the target message.

2. The method according to claim 1, wherein before the receiving the first input that is performed on the target message on the group communication interface by the operator, the method further comprises:
    receiving a second input that is performed on the group communication interface by the operator; and
    displaying a message selection control on a preset side of the target message on the group communication interface in response to the second input, where
    the first input acts on the message selection control corresponding to the target message.

3. The method according to claim 1, wherein after the displaying the message management control, the method further comprises:
    receiving a fourth input that is performed on a target area of the message management control by the operator; and
    sending, in response to the fourth input, the target message to a message receiving object corresponding to the target area, wherein
    the target area is associated with at least one message receiving object.

4. The method according to claim 1, further comprising:
    when a display interface is switched from a first display interface to a second display interface, displaying the message management control on the second display interface.

5. The method according to claim 1, wherein a display area of the message management control comprises at least one of the following:
    an area in which a group identifier of the group communication interface is located;
    ear areas of a special-shaped screen;
    curved areas of a curved screen;
    a foldable area of a flexible foldable screen;
    a back screen area of the terminal; and
    a display area of a wearable device associated with the terminal.

6. The method according to claim 1, wherein the first input further comprises a selection operation of selecting message receiving objects corresponding to the target message.

7. A non-transitory computer readable storage medium storing therein a computer program, wherein the computer program is configured to be executed by a processor to implement steps of the message management method according to claim 1.

8. A terminal, comprising a processor, a memory, and a computer program stored in the memory and configured to be executed by the processor, wherein the processor is configured to execute the computer program to implement a message management method applied to a terminal, the method comprising the following steps:
- receiving a first input that is performed on a target message on a group communication interface by an operator;
- displaying a message management control in response to the first input, wherein the message management control comprises information about processing progress of the target message; and
- updating display content of the message management control in the case of receiving a processing feedback message of at least one message receiving object for the target message;
- wherein different positions in the message management control indicate different respective message receiving objects;
- wherein after the displaying the message management control, the method further comprises:
- receiving a third input that is performed on the message management control by the operator; and
- displaying a floating window in response to the third input, wherein the floating window comprises detailed information about processing of the target message by only a message receiving object corresponding to a position of the third input on the message management control;
- wherein the message management control is a progress bar control, and the progress bar control comprises a first progress segment and a second progress segment; and
- a first ratio of a first length of the first progress segment to a second length of the second progress segment is equal to a second ratio of a first quantity of a first type of a message receiving object to a second quantity of a second type of a message receiving object, wherein
- the first type of the message receiving object is a message receiving object that has processed the target message, and the second type of the message receiving object is a message receiving object that has not processed the target message.

9. The terminal according to claim 8, wherein before the receiving the first input that is performed on the target message on the group communication interface by the operator, the method further comprises:
- receiving a second input that is performed on the group communication interface by the operator; and
- displaying a message selection control on a preset side of the target message on the group communication interface in response to the second input, where
- the first input acts on the message selection control corresponding to the target message.

10. The terminal according to claim 8, wherein after the displaying the message management control, the method further comprises:
- receiving a fourth input that is performed on a target area of the message management control by the operator; and
- sending, in response to the fourth input, the target message to a message receiving object corresponding to the target area, wherein
- the target area is associated with at least one message receiving object.

11. The terminal according to claim 8, wherein the method further comprises:
- when a display interface is switched from a first display interface to a second display interface, displaying the message management control on the second display interface.

12. The terminal according to claim 8, wherein a display area of the message management control comprises at least one of the following:
- an area in which a group identifier of the group communication interface is located;
- ear areas of a special-shaped screen;
- curved areas of a curved screen;
- a foldable area of a flexible foldable screen;
- a back screen area of the terminal; and
- a display area of a wearable device associated with the terminal.

13. The terminal according to claim 8, wherein the first input further comprises a selection operation of selecting message receiving objects corresponding to the target message.

* * * * *